Feb. 17, 1948.   SHAFI-UDDIN A. CHOUDHURY ET AL   2,436,200
SELF-PROPELLED TRANSMITTER
Filed Jan. 10, 1945

Inventors:
Shafi-Uddin Ahmed Choudhury,
Leonard Jack Clark,
Arthur Hemborough Maggs,
by Harry E. Dunham
Their Attorney.

Patented Feb. 17, 1948

2,436,200

UNITED STATES PATENT OFFICE 2,436,200

SELF-PROPELLED TRANSMITTER

Shafi-Uddin Ahmed Choudhury, Leonard Jack Clark, and Arthur Hemborough Maggs, Rugby, England, assignors to General Electric Company, a corporation of New York Application January 10, 1945, Serial No. 572,192
In Great Britain December 18, 1942

Section 1, Public Law 690, August 8, 1946
Patent expires January 18, 1963

4 Claims. (Cl. 318—23)

Our invention relates to electrical, self-propelled, multipolar angular motion transmitters or to a transmitter which operates both as an electrical motion transmitter and as its own driving motor. In carrying our invention into effect, we incorporate into the transmitter a wound stator which when suitably connected will cause the transmitter to run as a motor at any required speed, and in so running, cause the operation of the associated receiver in mutual synchronism.

Figure 1:
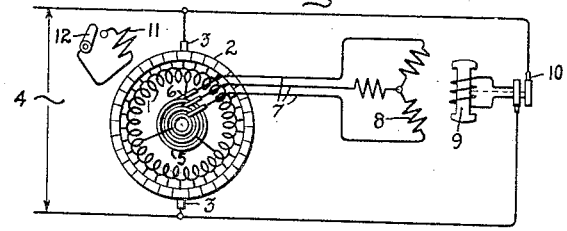
Figure 2:
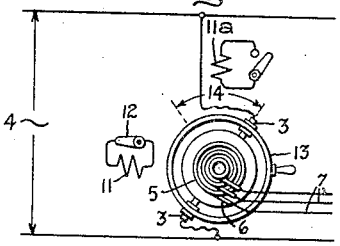
Figure 3:
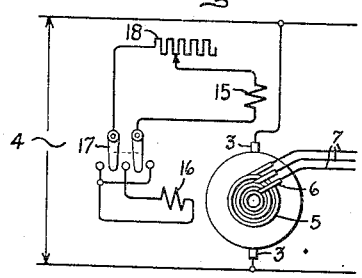
Figure 4:
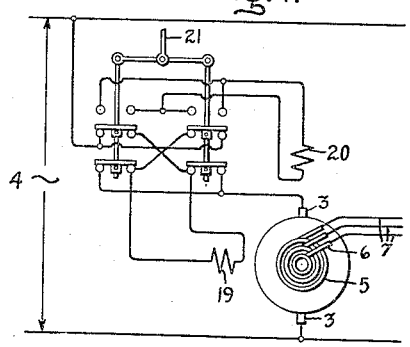
Figure 5:
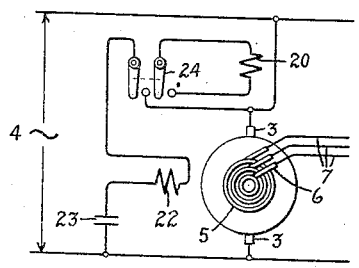
Figure 6:
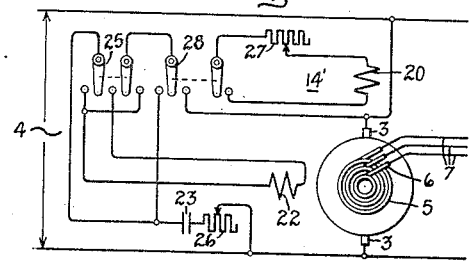
Figure 8:
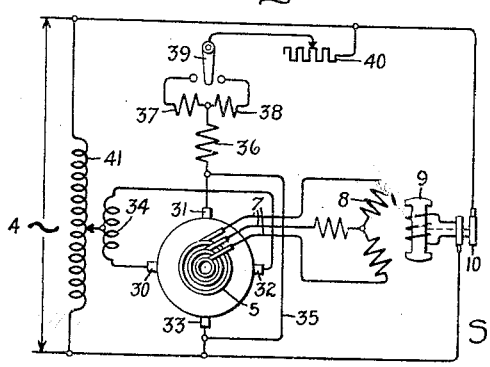
Figure 7:
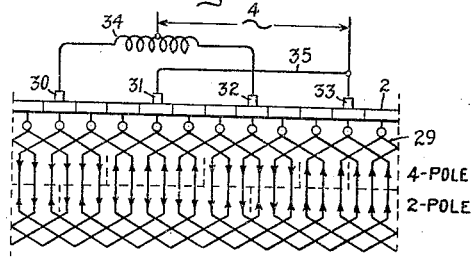

The features of our invention which are believed to be novel and patentable will be pointed out in the claims appended hereto. For a better understanding of our invention, reference is made in the following description to the accompanying drawings in which Fig. 1 represents the invention in its simplest form; Fig. 2 represents a variable speed, motor-driven transmitter; Fig. 3 represents a reversible, variable speed, motor-driven transmitter; Fig. 4 represents a reversible, variable speed, motor-driven transmitter with the stator field in series with the armature; Figs. 5 and 6 show embodiments of the invention having shunt motor characteristics, Fig. 6 being reversible; Fig. 7 represents a form of armature winding which may be used in the transmitter which renders the speed of the motor-driven transmitter independent of the load on the receiver; and Fig. 8 represents an embodiment of the invention using the features of Fig. 7 with other apparatus for carrying out the desired functions of the device.

In Fig. 1 there is shown a transmitter having a rotor winding 1 connected to a commutator 2 and excited through brushes 3 from a single-phase source of supply 4. There are a pair of excitation input brushes 3 for each pair of poles. The rotor winding is also connected at three equidistant points to slip rings 5 and brushes 6. We may also use inductively coupled separate windings on the rotor connected to the brushes 3 and slip rings 5. The three-phase arrangement of connections through the brushes 6 are connected over three lines 7 to the three-phase wound stator winding 8 of a receiver, the single-coil rotor 9 of which is connected through slip rings and brushes at 10 to the source 4 in parallel with the commutator brushes of the transmitter. The magnetic stator and rotor core structures of the transmitter and the core of the stator of the receiver are not shown, but will be in accordance with usual practice having slots wherein the windings are contained. As thus far described the apparatus constitutes a rotary motion transmitting system in that if the rotor 1—2 of the transmitter be rotated, the rotor 9 of the receiver will operate synchronously therewith and will reverse its direction of rotation with reversals in the direction of rotation of the transmitter, insofar as the receiver is free to follow the transmitter. The transmitter may be rotated manually, by some instrument whose motion is to be transmitted or by a motor especially provided for that purpose, and the torque necessary to rotate the transmitter is independent of the low torque required to drive the receiver rotor. The transmitter also is provided with a stator winding 11 which may be short circuited on itself by a switch 12. The winding 11 is displaced at an angle with respect to the axis of the brushes 3 and, therefore, with respect to the winding axis of the armature. When the switch 12 is open, the apparatus operates as above described. However, when the switch 12 is closed, the transmitter will run as a motor or be self-driven. The direction of rotation will depend upon the direction of displacement of the axis of winding 11 relative to the brush axis.

Fig. 2 is intended to represent the transmitter of Fig. 1 except that the axis of the brushes is made adjustable by a brush shifting mechanism 13 to change the angular relation between the axes of field winding and brushes. Also, an additional stator winding 11a is indicated in an axis at right angles to that of winding 11. The transmitter machine is capable of operating as a self-driven transmitter with either the winding 11 or 11a, but not both, and the winding not used will have its short circuiting switch open. If the brushes are adjustable over a range designated by the arrow 14 for the upper brush, the preferred position of the main motoring winding 11 is at 90 electrical degrees from the normal axis of the brushes, since with the brushes set in a middle position on an axis at right angles to the axis of winding 11, the machine will not run as a motor when the winding 11 is short circuited but is suitable for hand or other external power operation. Moreover, the torque or speed of the self-driven transmitter will progressively increase as the brushes are moved from such midposition, and the direction of torque or motor operation will depend upon the direction of brush shift from such midposition. Other means of shifting the angle between the brush and field axes from the 90 degree relation will be described.

If the motoring winding 11a is used, it will be necessary to open the same when the brushes are brought to such midposition because otherwise it would give rise to heavy short-circuit currents in the armature and be unsuitable for hand operation. Incidentally, using the stator winding 11 of Fig. 2 when the brushes are in the midposition of adjustment at right angles to the axis of winding 11, this winding acts to stiffen the electrical tie between transmitter and receiver. Since, however, the winding 11 is not on the same element of the machine as the exciting winding, this stiffening action produces a torque reaction on the transmitter approximately proportional to the load on the receiver. In actual practice this torque corresponds to the amount of stiffening obtained. By stiffening we refer to an increased accuracy of correspondence between the angular positions of transmitter and receiver for a given load on the receiver. If this stiffening is not required and the reaction torque produced under this condition is undesirable, the winding 11 can be open circuited when hand operation is desired. For these different reasons it is preferable to have the motoring winding 11 in an axis at right angles to the brush axis when the movable brushes are in a midadjustment position as shown in Fig. 2.

In Fig. 3 is shown an embodiment of the invention where the motoring winding designated as 11 in Figs. 1 and 2 is divided into two components 15 and 16 located in axes at right angles to each other with a reversing switch 17 for reversing the relative direction of short-circuited current flow in these two windings and a resistance 18 for varying the magnitude of such current. The winding portion 16 is that which produces the main field which, in cooperation with the currents in the armature, causes the machine to run as a motor. The other winding portion forms the secondary of a transformer of which the armature winding is the primary. The stator winding field source of supply is thus obtained by transformer action from the armature and thus the stator field is, in effect, in series with the armature. Reversal of rotation is obtained by the reversing switch 17 having the effect of reversing the field winding 16. Winding 15 also provides a field axis shifting component. Switch 17 may be left open for hand operation. With switch 17 closed for self-propelled transmitter operation, the speed or torque may be varied by the variable resistance 18. An increase in resistance decreases the torque. While a variation in torque or speed could be had by a variable resistance in the armature circuit, the variable resistance in the field circuit is to be much preferred as it does not produce undesirable circulating currents in the receiver.

In Fig. 4 we have shown an embodiment where the stator field winding 19 is directly in series with the armature. Reversal of the direction of rotation is had by reversing the field winding 19. Stiffening action for hand operation is obtained by short circuiting the field winding 19. A transformer secondary winding 20 is provided which is short circuited when the transmitter is self-driven in order to reduce the impedance of the armature to permit the flow of torque producing currents. Winding 20 also provides a field flux axis shifting component. The various switching operations are carried out by a switching mechanism having an operating handle 21. In the central position of the switching mechanism shown transformer winding 20 is open circuited, field winding 19 is short circuited, and the armature is connected across the line 4. When the handle 21 of the switch member is moved to the right, the contactors on the left are raised and those on the right remain as shown. This short circuits the transformer winding 20 through the upper pair of left contacts, and the field winding 19 is connected in series with the armature across the line in one direction through the two lower right sets of contacts. When the handle 21 is moved to the left of center position, the contactors on the right are raised and those on the left remain in the positions illustrated. This short circuits the winding 20 at the upper right set of contacts and the winding 19 is now connected in series with the armature across the line through the two lower left sets of contacts, the winding 20 being in a reversed direction to that previously mentioned. This embodiment has series motor characteristics as in the case in Figs. 1, 2 and 3; that is, the higher the motor torque the lower the operating speed.

In Fig. 5 we have shown an embodiment of the invention where the motoring field stator winding 22 may be connected across the line 4 to give shunt motor characteristics. Here in order that the phase relation of the field current may be suitable, it is desirable to connect a condenser 23 in series with the winding 22. A switch 24 is provided to open the field winding 22 for hand operation. No stiffening provision is included. It is also desirable to provide a transformer secondary winding 20 and short circuit it by the switch 24 during motoring operation to lower the effective impedance of the armature during motoring operation.

Fig. 6 shows an embodiment similar to Fig. 5 but incorporating provisions for reversing, speed control, and stiffening. Reversing of field winding 22 is accomplished by a switch 25. Speed control is accomplished by variable resistances 26 and 27, of which 27 is in the short-circuited transformer winding 14 circuit and has the effect of varying the armature current while resistance 26 regulates the current of the shunt field winding 22. Hand or motoring control is selected by a switch 28 which, if closed to the right, causes the machine to operate as a motor. If switch 28 is open, the machine is suitable for hand operation without any stiffening effect, while closing this switch to the left short circuits the field winding 22 and introduces the stiffening effect previously described. For hand operation with or without stiffening effect the transformer winding 20 remains open. By hand operation we refer to any operation other than by self-driven motoring operation.

In the above forms of the invention when the transmitter is self-driven as a motor, the speed thereof may vary somewhat due to changes in load on the receiver. This is because the load current supplied by the transmitter to the receiver over the lines 7 reacts upon the transmitter magnetic fields which are used for motoring action and if this current varies with variations in load on the receiver, a speed change occurs. This can be avoided by a transmitter arrangement where the number of poles associated with the motoring function is different from the number of poles associated with the transmitting function so that the windings performing these two functions are mutually non-inductive notwithstanding the fact that the armature winding of the transmitter performs both a motoring function and a transmitter function. Figs. 7 and 8 relate to an arrangement of this character.

Fig. 7 shows a portion of a transmitter armature winding 29 with associated commutator 2 and brush gear so arranged as to be capable of carrying out simultaneously and in a non-interacting manner the function of an armature winding for the transmitter and an armature winding for the motoring action as hereinbefore described. Fig. 8 represents diagrammatically an embodiment of the invention which incorporates the armature, commutator, and brush gear of Fig. 7, together with the other apparatus for carrying out the functions previously explained.

Fig. 7 shows diagrammatically an elementary form of armature winding arranged so as to operate as a four-pole transmitter armature and as a two-pole motor armature. Other suitable forms of winding and non-inductive pole number ratio may be used. In the present case the winding pitch may be equal to or preferably slightly greater than 100 per cent with respect to the larger pole number and is, therefore, 50 per cent or slightly greater with respect to the smaller pole number. There are four equidistantly spaced sets of brushes designated 30, 31, 32, and 33 on the commutator 2. As shown in Fig. 8 brushes 30 and 32 in one axis are interconnected through a center tapped choke coil 34, while brushes 31 and 33 in the quadrature axis are directly interconnected by the connector 35. The choke 34 is constructed so as to be highly inductive to currents flowing between brushes 30 and 32 and non-inductive with respect to a current entering it by way of the center tap and dividing equally in the two halves of the choke to enter the armature through the two brushes 30 and 32. When an alternating current supply is connected with one terminal to the center tap of the choke and the other terminal to brushes 31 and 33, currents will flow to produce four-pole magnetization of the armature. The choke 34 is non-inductive for this condition and the armature will, therefore, fulfill all requirements of a four-pole transmitter, and the slip rings 5 for taking off the receiver current may be connected to the commutated winding or to a secondary winding in inductive relation therewith at three phase points for a four-pole winding. In Fig. 7 top arrows on the armature conductors show the direction of the four-pole currents and the bottom arrows show the direction of E. M. F. set up by a two-pole field effective in the axis of brushes 31 and 33. A two-pole field effective in the axis of brushes 31—33 would produce a maximum voltage between these brushes but since they are interconnected by conductor 35, the armature is, in effect, short circuited with respect to this axis. Since the choke 34 is highly inductive with respect to currents flowing between brushes 30 and 32, the armature is not short circuited with respect to the four-pole armature axis defined by brushes 30 and 32. Hence, the machine may function as a four-pole transmitter.

To obtain two-pole motoring action, the stator is provided with a two-pole winding 36 with its axis in line with brushes 31 and 33, and there are two additional stator windings 37 and 38 at right angles to winding 36, and a switch 39 is provided to connect either winding 37 or 38 in series with winding 36 across the source of supply 4. Thus a two-pole field may be produced in the machine. This field will be inclined to the axis of the brushes 31 and 33 either clockwise or counterclockwise, depending upon whether switch 39 is closed to the right or to the left. It will now be recognized by those skilled in the art that the machine will function as a two-pole repulsion motor and will run clockwise or counterclockwise, depending upon the position of the field energizing and direction reversing switch 39. It will also be recognized that although the currents associated with this motoring operation are superimposed on those associated with transmitter operation within the armature winding, they produce no resultant interaction because, while the two sets of armature current are codirectional in one-half of the armature, they are in opposition in the other half. The motoring speed may be varied by a variable resistance in the armature or field motoring circuit as represented by the variable resistance 40 in the field circuit. The invention is not limited to the particular field arrangement described. It is also evident that reversing and speed control may be had with only field winding 36 by shifting the brushes.

The supply to the transmitter armature through the choke 34 is preferably through an auto transformer 41, or equivalent, designed to have sufficient leakage reactance as to act as a reactor to compensate for excessive secondary circulating currents in the transmitter which tend to occur at high motoring speeds. The form of the invention of Figs. 7 and 8 is useful where it is desired that the speed of the transmitter, operating as its own motor, be independent of the load on the transmitter.

What we claim as new and desire to secure by Letters Patent of the United States, is:

1. A multipolar synchronous transmitter comprising a rotary armature winding member, a commutator therefor, a three-phase arrangement of transmitter output connections to said armature, a pair of brushes per pair of poles resting upon said commutator for exciting said armature with alternating current, said transmitter performing its transmitter function by rotation of said armature with respect to said brushes, and a stationary field winding cooperating with said armature to cause operation of said transmitter as an alternating current motor while performing its transmitter action, the axis of said field winding being positioned 90 electrical degrees from the normal brush axis of said armature, means for shifting the angular relation between the brush axis and the effective field flux axis, and means for short circuiting said winding, said winding serving when short circuited to improve the transmitter action without such motoring action when the brush axis is 90 degrees from the field axis.

2. A multipolar synchronous motion transmitter comprising a rotary armature winding member, a three-phase arrangement of output connections thereto, a commutator for said armature member, a pair of alternating current input brushes per pair of poles resting upon said commutator, said transmitter performing its transmitter action by rotation of said armature member relative to the brushes, a stationary field winding cooperating with said armature member for causing motoring action by said transmitter simultaneously with its transmitting function, said field winding being positioned with its flux axis 90 electrical degrees from the normal brush axis of said transmitter, a second stationary winding cooperating with said armature member acting as the secondary of a transformer and having its flux axis in line with the normal brush axis of said transmitter, a source of supply for the motoring field winding, and switching means for de-energizing and for reversing the direction of said motoring field and for opening and closing a short circuit across the transformer secondary winding.

3. A multipolar synchronous motion transmitter comprising a rotary armature winding member, a three-phase arrangement of output brushes connected to said armature member, a commutator for said armature member, a pair of brushes per pair of poles resting on said commutator, said transmitter performing its transmitter function when said brushes are excited from an alternating current input source and said armature is rotated, a stationary field winding having an axis 90 electrical degrees from the brush axis for cooperating with the armature to obtain alternating motoring action while the transmitter is performing its transmitter function, a source of supply for said field winding, switching means for opening, short circuiting, and for reversing the direction of current flow in said winding when energized from its source of supply, means for varying the magnitude of current flow in said field winding, a transformer secondary winding with its axis in line with the brush axis of said transmitter and cooperating with the armature winding member as a transformer primary, and means for opening and closing a short circuit across said transformer secondary winding.

4. A multipolar synchronous motion transmitter comprising a rotary armature winding member, a three-phase arrangement of transmitter output connections thereto, a commutator for said armature member, a pair of brushes per pair of poles on said commutator, a source of alternating current supply connected to said brushes, said transmitter performing its transmitter function when its armature is rotated, a stationary field winding having its axis 90 electrical degrees from the brush axis of said transmitter and cooperating with said armature member for producing motoring action, said field winding being connected to said source of supply through a phase shifting device, and switching means for opening, closing, and reversing the connections between said field winding and source of supply, a second stationary winding with its axis in line with the brush axis to provide a field axis shift component, and means for varying the current flow in said first mentioned field winding.

SHAFI-UDDIN AHMED CHOUDHURY.
LEONARD JACK CLARK.
ARTHUR HEMBOROUGH MAGGS.

REFERENCES CITED

The following references are of record in the file of this patent:

UNITED STATES PATENTS

| Number | Name | Date |
| --- | --- | --- |
| 1,883,711 | Granat | Oct. 18, 1932 |